US010884576B2

(12) United States Patent
Mate et al.

(10) Patent No.: US 10,884,576 B2
(45) Date of Patent: Jan. 5, 2021

(54) MEDIATED REALITY

(71) Applicant: Nokia Technologies Oy, Espoo (FI)

(72) Inventors: Sujeet Shyamsundar Mate, Tampere (FI); Arto Lehtiniemi, Lempäälä (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 32 days.

(21) Appl. No.: 15/580,080

(22) PCT Filed: Jun. 15, 2016

(86) PCT No.: PCT/FI2016/050430
§ 371 (c)(1),
(2) Date: Dec. 6, 2017

(87) PCT Pub. No.: WO2016/203111
PCT Pub. Date: Dec. 22, 2016

(65) Prior Publication Data

US 2018/0300040 A1 Oct. 18, 2018

(30) Foreign Application Priority Data

Jun. 16, 2015 (EP) .................................... 15172436

(51) Int. Cl.
*G06F 3/0481* (2013.01)
*G06F 3/01* (2006.01)
(Continued)

(52) U.S. Cl.
CPC .......... *G06F 3/04815* (2013.01); *G06F 3/011* (2013.01); *G06F 3/012* (2013.01);
(Continued)

(58) Field of Classification Search
None
See application file for complete search history.

(56) References Cited

U.S. PATENT DOCUMENTS

2004/0080716 A1 4/2004 Anderson et al.
2010/0045666 A1 2/2010 Kornmann et al.
(Continued)

FOREIGN PATENT DOCUMENTS

JP 2003-534594 11/2003
JP 2012-501016 1/2012
(Continued)

OTHER PUBLICATIONS

International Search Report and Written Opinion received for corresponding Patent Cooperation Treaty Application No. PCT/FI2016/050430, dated Aug. 26, 2016, 13 pages.
(Continued)

*Primary Examiner* — Ifedayo B Iluyomade
(74) *Attorney, Agent, or Firm* — Alston & Bird LLP

(57) ABSTRACT

A method comprising: displaying to a user a current virtual scene of a virtual space from a current point of view at a current position, the virtual scene comprising a user-input artificial virtual object; mapping a three-dimensional gesture of the user to a corresponding three-dimensional gesture in the virtual space that interacts with the user-input artificial virtual object; and in response to determining that the corresponding three-dimensional gesture in the virtual space interacts with the user-input artificial virtual object, displaying to the user a new virtual scene of the virtual space from a new point of view at a new position different to the current position.

18 Claims, 9 Drawing Sheets

(51) Int. Cl.
*G06F 3/0484* (2013.01)
*G06F 3/03* (2006.01)

(52) U.S. Cl.
CPC .............. *G06F 3/013* (2013.01); *G06F 3/017* (2013.01); *G06F 3/0304* (2013.01); *G06F 3/04847* (2013.01)

(56) References Cited

U.S. PATENT DOCUMENTS

| | | | | |
|---|---|---|---|---|
| 2011/0292181 | A1* | 12/2011 | Acharya | G07C 9/37<br>348/47 |
| 2013/0326364 | A1* | 12/2013 | Latta | G06F 3/012<br>715/751 |
| 2014/0118343 | A1* | 5/2014 | Takami | G06T 15/20<br>345/419 |
| 2014/0267400 | A1* | 9/2014 | Mabbutt | G06F 1/163<br>345/633 |
| 2016/0210781 | A1* | 7/2016 | Thomas | G06F 3/013 |

FOREIGN PATENT DOCUMENTS

| | | |
|---|---|---|
| JP | 2018-501570 | 1/2018 |
| WO | WO 01/90870 | 11/2001 |
| WO | WO 2014/162852 | 10/2014 |
| WO | WO 2016/100931 | 6/2016 |

OTHER PUBLICATIONS

Extended European Search Report for corresponding Patent Application No. 15172436.6, dated Dec. 8, 2015, 9 pages.

Kelly et al., “An Architecture for Multiple Perspective Interactive Video”, Proceedings of the Third ACM International conference on Multimedia, Jan. 1, 1995, 24 pages.

Jain et al., “Multiple Perspective Interactive Video”, Proceedings of the International Conference on Multimedia computing and Systems, May 15, 1995, 10 pages.

“SnapAR: Quick viewpoint switching for Hand-Held Augmented Reality Using Virtual Snapshots—Youtube” [online] retrieved May 29, 2019] Retrieved from Internet:<URL:http://www.youtube.com/watch?v=rU5aJLOuiDI> dated Feb. 27, 2013.

“The Most Advanced Product Photography Equipment on the Market” [online] retrieved May 29, 2019] Retrieved from Internet:<URL:http://www.pixmoor.com/en/products/> dated Aug. 2016.

Sato, K. Introduce how to enjoy Forza Motorsport4 at once, [online], Japan Retrieved via Internet<URL:https://web.archive.org/web/20111104004754/https://ad.impress.co.jp/special/microsoft1110_2/> dated Nov. 4, 2011.

Office Action for Japanese Application No. 2017-565058 dated Mar. 14, 2019.

Office Action for Indonesian Application No. PID 2017 08892 dated Sep. 5, 2019.

Office Action for Indonesia Application No. PID201708892 dated Jan. 29, 2020, 4 pages.

* cited by examiner

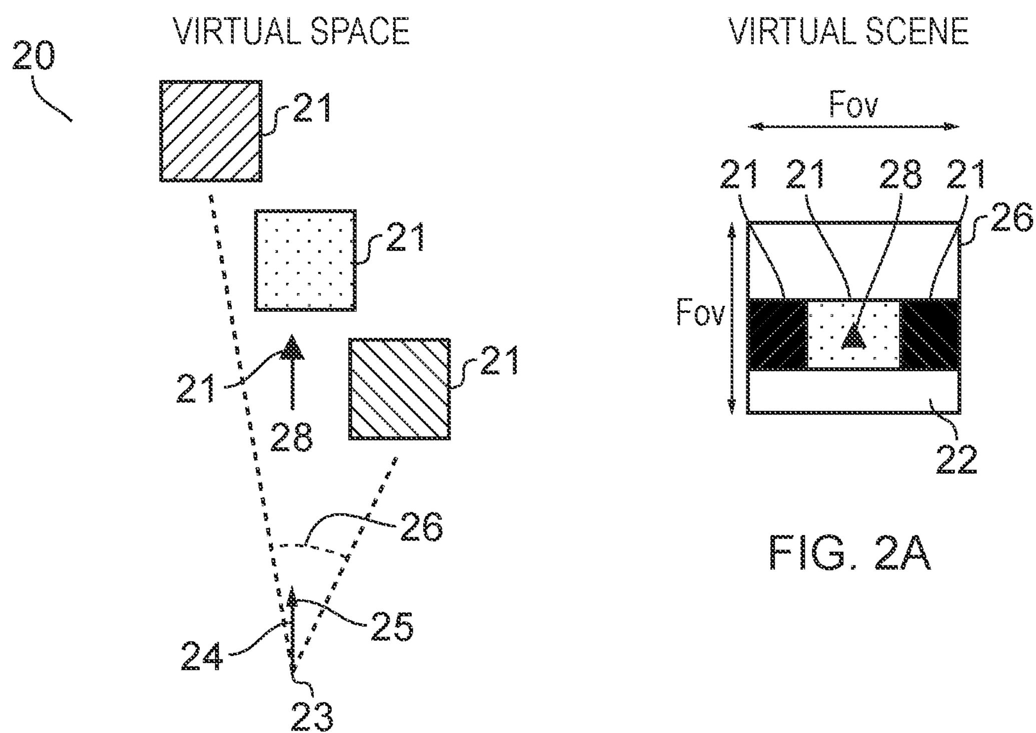
FIG. 1A
FIG. 2A
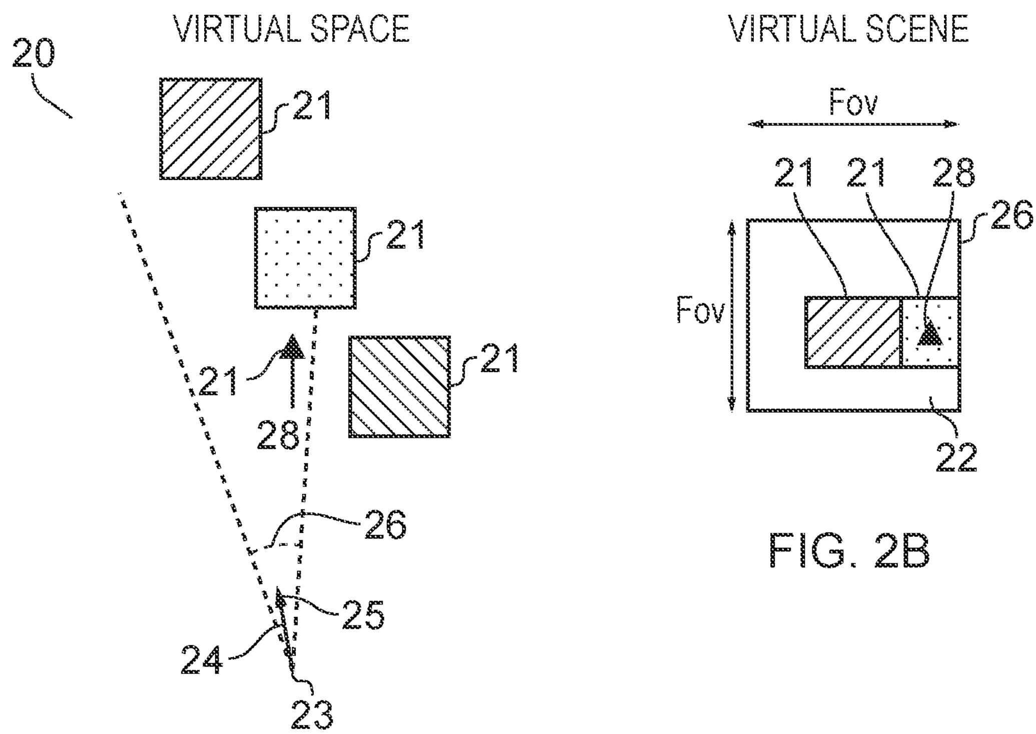
FIG. 1B
FIG. 2B

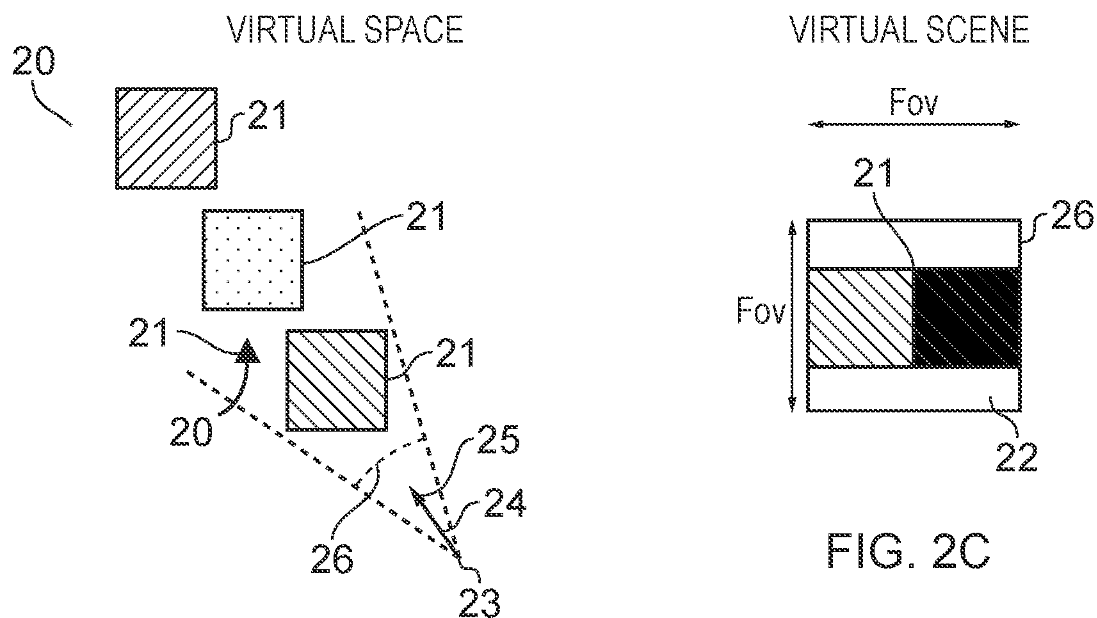
FIG. 1C
FIG. 2C
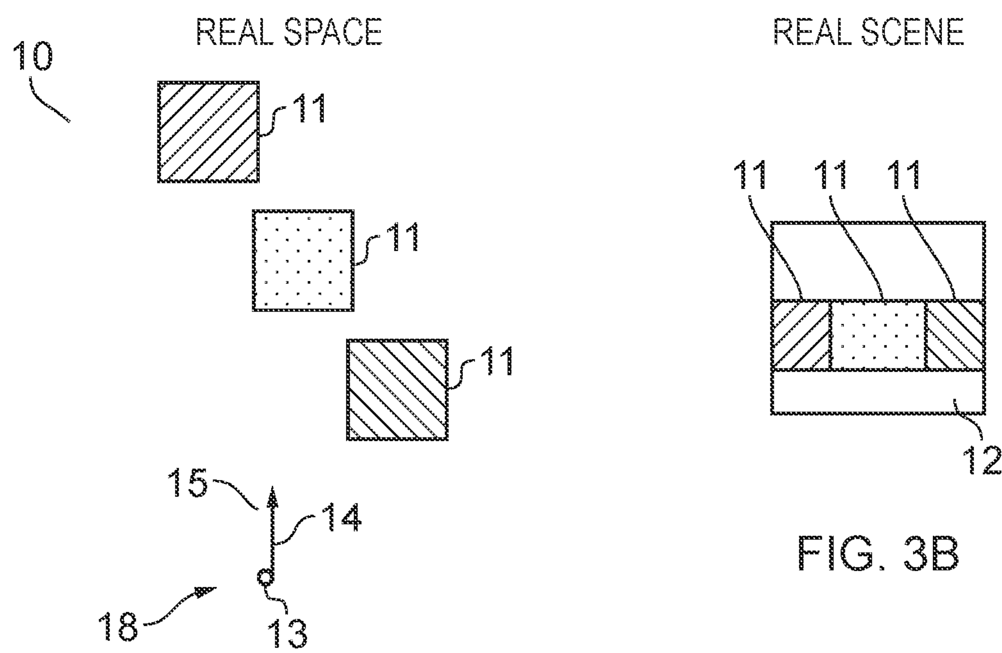
FIG. 3A
FIG. 3B

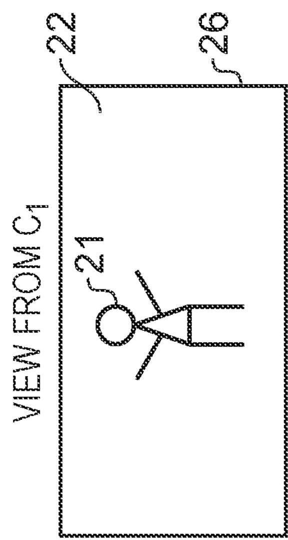
FIG. 12A
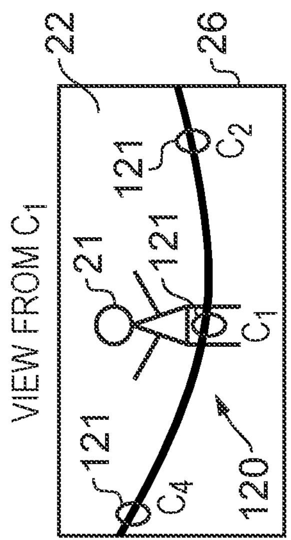
FIG. 12C
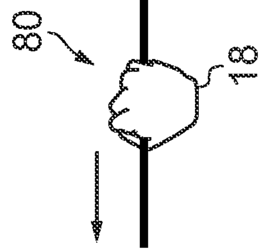
FIG. 12B
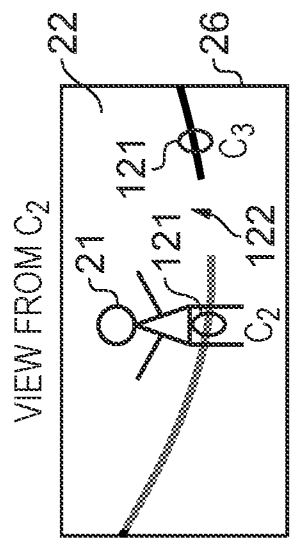
FIG. 12E
80
18
FIG. 12D
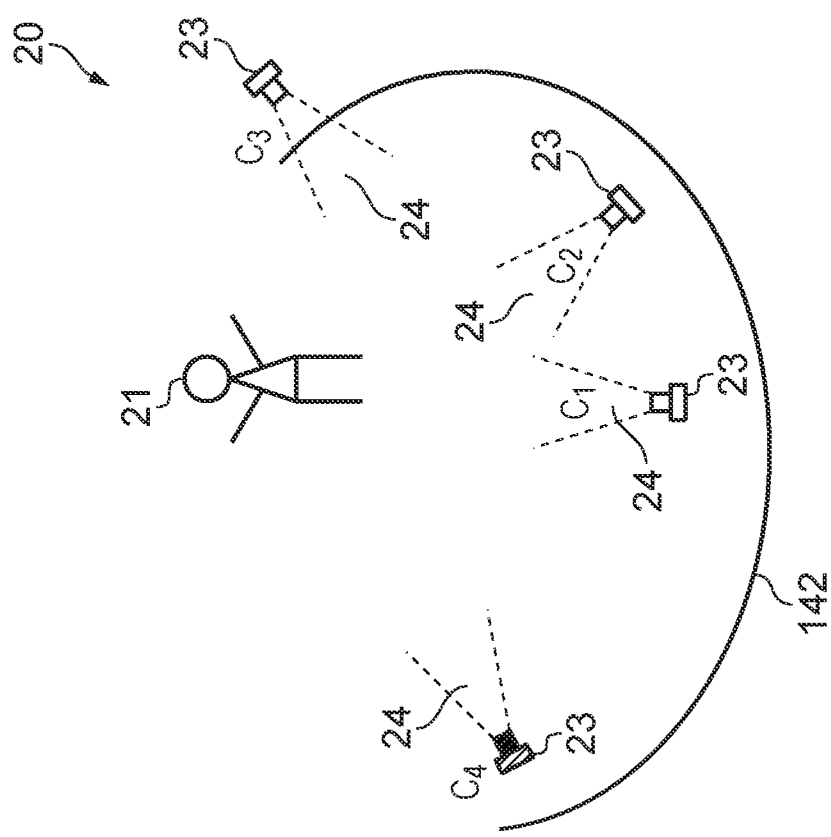
FIG. 11

MEDIATED REALITY

RELATED APPLICATION

This application was originally filed as Patent Cooperation Treaty Application No. PCT/FI2016/050430 filed Jun. 15, 2016 which claims priority benefit to European Patent Application No. 15172436.6, filed Jun. 16, 2015.

TECHNOLOGICAL FIELD

Embodiments of the present invention relate to mediated reality for example augmented reality or virtual reality.

BACKGROUND

Mediated reality in this document refers to a user experiencing a fully or partially artificial environment.

Augmented reality is a form of mediated reality in which a user experiences a partially artificial, partially real environment. Virtual reality is a form of mediated reality in which a user experiences a fully artificial environment.

BRIEF SUMMARY

According to various, but not necessarily all, embodiments of the invention there is provided a method comprising: displaying to a user a current virtual scene of a virtual space from a current point of view at a current position, the virtual scene comprising a user-input artificial virtual object; mapping a three-dimensional gesture of the user to a corresponding three-dimensional gesture in the virtual space that interacts with the user-input artificial virtual object; and in response to determining that the corresponding three-dimensional gesture in the virtual space interacts with the user-input artificial virtual object, displaying to the user a new virtual scene of the virtual space from a new point of view at a new position different to the current position.

According to various, but not necessarily all, embodiments of the invention there is provided an apparatus comprising: means for displaying to a user a current virtual scene of a virtual space from a current point of view at a current position, the virtual scene comprising a user-input artificial virtual object; means for mapping a three-dimensional gesture of the user to a corresponding three-dimensional gesture in the virtual space that interacts with the user-input artificial virtual object; and means for, in response to determining that the corresponding three-dimensional gesture in the virtual space interacts with the user-input artificial virtual object, displaying to the user a new virtual scene of the virtual space from a new point of view at a new position different to the current position.

According to various, but not necessarily all, embodiments of the invention there is provided a computer program, which, when executed by a processor, performs: causing display to a user a current virtual scene of a virtual space from a current point of view at a current position, the virtual scene comprising a user-input artificial virtual object; causing mapping a three-dimensional gesture of the user to a corresponding three-dimensional gesture in the virtual space that interacts with the user-input artificial virtual object; and causing, in response to determining that the corresponding three-dimensional gesture in the virtual space interacts with the user-input artificial virtual object, displaying to the user a new virtual scene of the virtual space from a new point of view at a new position different to the current position.

According to various, but not necessarily all, embodiments of the invention there is provided an apparatus comprising: at least one processor; and at least one memory including computer program code the at least one memory and the computer program code configured to, with the at least one processor, cause the apparatus at least to perform: displaying to a user a current virtual scene of a virtual space from a current point of view at a current position, the virtual scene comprising a user-input artificial virtual object; mapping a three-dimensional gesture of the user to a corresponding three-dimensional gesture in the virtual space that interacts with the user-input artificial virtual object; and in response to determining that the corresponding three-dimensional gesture in the virtual space interacts with the user-input artificial virtual object, displaying to the user a new virtual scene of the virtual space from a new point of view at a new position different to the current position.

According to various, but not necessarily all, embodiments of the invention there is provided examples as claimed in the appended claims.

BRIEF DESCRIPTION

For a better understanding of various examples that are useful for understanding the brief description, reference will now be made by way of example only to the accompanying drawings in which:

FIGS. 1A-1C and 2A-2C illustrate examples of mediated reality in which FIGS. 1A, 1B, 1C illustrate the same virtual space and different points of view and FIGS. 2A, 2B, 2C illustrate a virtual scene from the perspective of the respective points of view;

FIG. 3A illustrates an example of a real space and FIG. 3B illustrates an example of a real scene that partially corresponds with the virtual scene of FIG. 1B;

FIG. 11 illustrates an example of a virtual space that corresponds to the real space illustrated in FIG. 10;

FIG. 12A illustrates an example of a virtual scene not comprising a user input virtual object;

FIG. 12B illustrates an example of an initiation gesture;

FIG. 12C illustrates an example of a virtual scene comprising a user input artificial virtual object;

FIG. 12D illustrates an example of a three-dimensional command gesture of the user for changing a position of a point of view defining the virtual scene;

FIG. 12E illustrates an example of a virtual scene, determined by the new position of the point of view, comprising a user input artificial virtual object.

DETAILED DESCRIPTION

Figure 4:
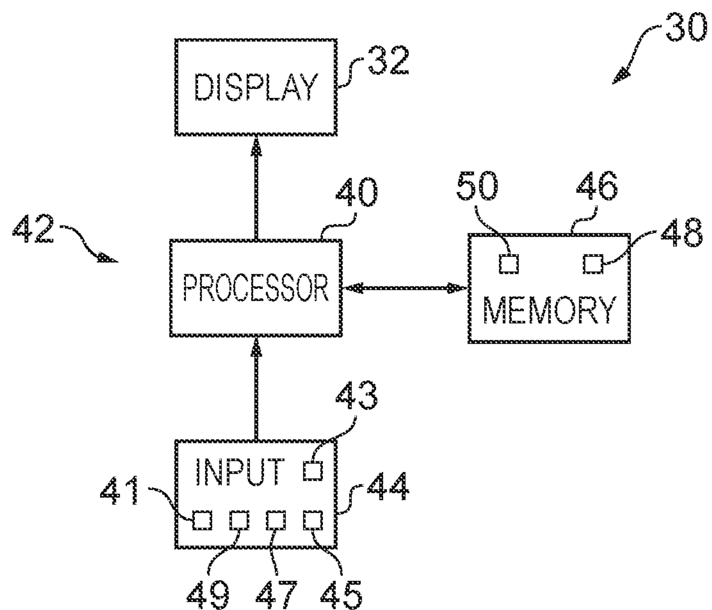
FIG. 4 illustrates an example of an apparatus that is operable to enable mediated reality and/or augmented reality and/or virtual reality.

In the following description, apparatus and method will be described that allow a user 18 to change a position 23 of a point of view 24 within a virtual space 20 and thereby change a virtual scene 22 displayed to the user. The user performs a three-dimensional gesture which, when mapped to the virtual space 20, interacts with a user-input artificial virtual object 120 displayed in the virtual scene 22 causing the change in position 23.

Definitions

"virtual space" refers to fully or partially artificial environment, which may be three dimensional.

"virtual scene" refers to a representation of the virtual space viewed from a particular point of view within the virtual space.

"real space" refers to a real environment, which may be three dimensional.

"real scene" refers to a representation of the real space viewed from a particular point of view within the real space.

"mediated reality" in this document refers to a user visually experiencing a fully or partially artificial environment (a virtual space) as a virtual scene at least partially displayed by a computer to a user. The virtual scene is determined by a point of view within the virtual space and a field of view. Displaying the virtual scene means providing it in a form that can be seen by the user.

"augmented reality" in this document refers to a form of mediated reality in which a user visually experiences a partially artificial environment (a virtual space) as a virtual scene comprising a real scene of a physical real world environment (real space) supplemented by one or more visual elements displayed by an apparatus to a user;

"virtual reality" in this document refers to a form of mediated reality in which a user visually experiences a fully artificial environment (a virtual space) as a virtual scene displayed by an apparatus to a user;

"perspective-mediated" as applied to mediated reality, augmented reality or virtual reality means that user actions determine the point of view within the virtual space, changing the virtual scene;

"first person perspective-mediated" as applied to mediated reality, augmented reality or virtual reality means perspective mediated with the additional constraint that the user's real point of view determines the point of view within the virtual space;

"third person perspective-mediated" as applied to mediated reality, augmented reality or virtual reality means perspective mediated with the additional constraint that a point of view other than the user's real point of view determines the point of view within the virtual space;

"user interactive-mediated" as applied to mediated reality, augmented reality or virtual reality means that user actions at least partially determine what happens within the virtual space;

"displaying" means providing in a form that is perceived visually by the user.

"virtual object" is an object in a virtual scene

"artificial virtual object" is a virtual object introduced by a computer

"user input artificial virtual object" is an artificial virtual object used for input by a user.

DESCRIPTION

FIGS. 1A-1C and 2A-2C illustrate examples of mediated reality. The mediated reality may be augmented reality or virtual reality.

FIGS. 1A, 1B, 1C illustrate the same virtual space 20 comprising the same virtual objects 21, however, each FIG. illustrates a different point of view 24. The position and direction of a point of view 24 can change independently. The direction but not the position of the point of view 24 changes from FIG. 1A to FIG. 1B. The direction and the position of the point of view 24 changes from FIG. 1B to FIG. 1C.

FIGS. 2A, 2B, 2C illustrate a virtual scene 22 from the perspective of the different points of view 24 of respective FIGS. 1A, 1B, 1C. The virtual scene 22 is determined by the point of view 24 within the virtual space 20 and a field of view 26. The virtual scene 22 is at least partially displayed to a user.

The virtual scenes 22 illustrated may be mediated reality scenes, virtual reality scenes or augmented reality scenes. A virtual reality scene displays a fully artificial virtual space 20. An augmented reality scene displays a partially artificial, partially real virtual space 20.

The mediated reality, augmented reality or virtual reality may be user interactive-mediated. In this case, user actions at least partially determine what happens within the virtual space 20. This may enable interaction with a virtual object 21 such as a visual element 28 within the virtual space 20.

The mediated reality, augmented reality or virtual reality may be perspective-mediated. In this case, user actions determine the point of view 24 within the virtual space 20, changing the virtual scene 22. For example, as illustrated in FIGS. 1A, 1B, 1C a position 23 of the point of view 24 within the virtual space 20 may be changed and/or a direction or orientation 25 of the point of view 24 within the virtual space 20 may be changed. If the virtual space 20 is three-dimensional, the position 23 of the point of view 24 has three degrees of freedom e.g. up/down, forward/back, left/right and the direction 25 of the point of view 24 within the virtual space 20 has three degrees of freedom e.g. roll, pitch, yaw. The point of view 24 may be continuously variable in position 23 and/or direction 25 and user action then changes the position and/or direction of the point of view 24 continuously. Alternatively, the point of view 24 may have discrete quantised positions 23 and/or discrete quantised directions 25 and user action switches by discretely jumping between the allowed positions 23 and/or directions 25 of the point of view 24.

FIG. 3A illustrates a real space 10 comprising real objects 11 that partially corresponds with the virtual space 20 of FIG. 1A. In this example, each real object 11 in the real space 10 has a corresponding virtual object 21 in the virtual space 20, however, each virtual object 21 in the virtual space 20 does not have a corresponding real object 11 in the real space 10. In this example, one of the virtual objects 21, the computer-generated visual element 28, is an artificial virtual object 21 that does not have a corresponding real object 11 in the real space 10.

A linear mapping exists between the real space 10 and the virtual space 20 and the same mapping exists between each real object 11 in the real space 10 and its corresponding virtual object 21. The relative relationship of the real objects

11 in the real space 10 is therefore the same as the relative relationship between the corresponding virtual objects 21 in the virtual space 20.

FIG. 3B illustrates a real scene 12 that partially corresponds with the virtual scene 22 of FIG. 1B, it includes real objects 11 but not artificial virtual objects. The real scene is from a perspective corresponding to the point of view 24 in the virtual space 20 of FIG. 1A. The real scene 12 content is determined by that corresponding point of view 24 and the field of view 26.

FIG. 2A may be an illustration of an augmented reality version of the real scene 12 illustrated in FIG. 3B. The virtual scene 22 comprises the real scene 12 of the real space 10 supplemented by one or more visual elements 28 displayed by an apparatus to a user. The visual elements 28 may be a computer-generated visual element. In a see-through arrangement, the virtual scene 22 comprises the actual real scene 12 which is seen through a display of the supplemental visual element(s) 28. In a see-video arrangement, the virtual scene 22 comprises a displayed real scene 12 and displayed supplemental visual element(s) 28. The displayed real scene 12 may be based on an image from a single point of view 24 or on multiple images from different points of view 24 at the same time, processed to generate an image from a single point of view 24.

FIG. 4 illustrates an example of an apparatus 30 that is operable to enable mediated reality and/or augmented reality and/or virtual reality.

The apparatus 30 comprises a display 32 for providing at least parts of the virtual scene 22 to a user in a form that is perceived visually by the user. The display 32 may be a visual display that provides light that displays at least parts of the virtual scene 22 to a user. Examples of visual displays include liquid crystal displays, organic light emitting displays, emissive, reflective, transmissive and transflective displays, direct retina projection display, near eye displays etc.

The display 32 is controlled in this example but not necessarily all examples by a controller 42.

Implementation of a controller 42 may be as controller circuitry. The controller 42 may be implemented in hardware alone, have certain aspects in software including firmware alone or can be a combination of hardware and software (including firmware).

As illustrated in FIG. 4 the controller 42 may be implemented using instructions that enable hardware functionality, for example, by using executable computer program instructions 48 in a general-purpose or special-purpose processor 40 that may be stored on a computer readable storage medium (disk, memory etc) to be executed by such a processor 40.

The processor 40 is configured to read from and write to the memory 46. The processor 40 may also comprise an output interface via which data and/or commands are output by the processor 40 and an input interface via which data and/or commands are input to the processor 40.

The memory 46 stores a computer program 48 comprising computer program instructions (computer program code) that controls the operation of the apparatus 30 when loaded into the processor 40. The computer program instructions, of the computer program 48, provide the logic and routines that enables the apparatus to perform the methods illustrated in FIGS. 5A & 5B. The processor 40 by reading the memory 46 is able to load and execute the computer program 48.

The apparatus 30 therefore comprises:

at least one processor 40; and at least one memory 46 including computer program code 48 the at least one memory 46 and the computer program code 48 configured to, with the at least one processor 40, cause the apparatus 30 at least to perform:

displaying to a user a current virtual scene of a virtual space from a current point of view at a current position, the virtual scene comprising a user-input artificial virtual object;

mapping a three-dimensional gesture of the user to a corresponding three-dimensional gesture in the virtual space that interacts with the user-input artificial virtual object; and in response to determining that the corresponding three-dimensional gesture in the virtual space interacts with the user-input artificial virtual object, displaying to the user a new virtual scene of the virtual space from a new point of view at a new position different to the current position.

The computer program 48 may arrive at the apparatus 30 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 48. The delivery mechanism may be a signal configured to reliably transfer the computer program 48. The apparatus 30 may propagate or transmit the computer program 48 as a computer data signal.

Although the memory 46 is illustrated as a single component/circuitry it may be implemented as one or more separate components/circuitry some or all of which may be integrated/removable and/or may provide permanent/semi-permanent/dynamic/cached storage.

Although the processor 40 is illustrated as a single component/circuitry it may be implemented as one or more separate components/circuitry some or all of which may be integrated/removable. The processor 40 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Figure 5A:
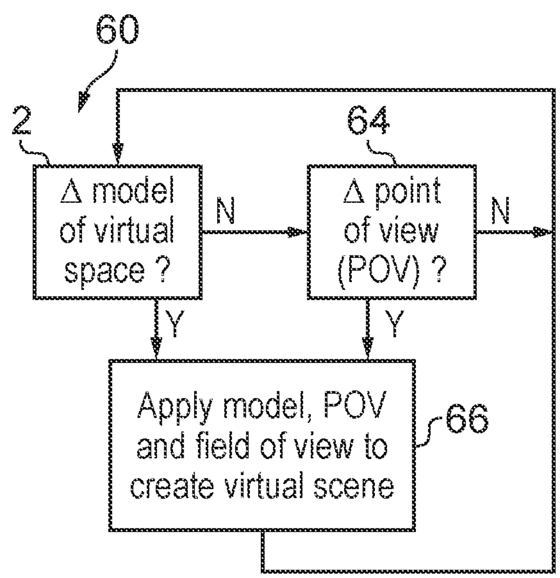
FIG. 5A illustrates an example of a method for enabling mediated reality and/or augmented reality and/or virtual reality.
Figure 5B:
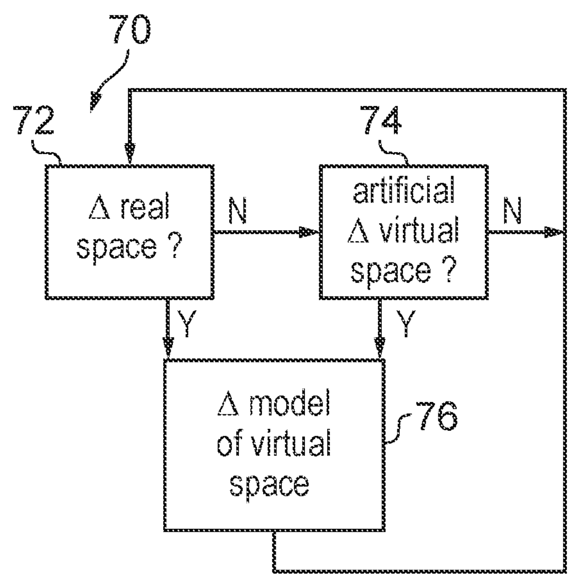
FIG. 5B illustrates an example of a method for updating a model of the virtual space for augmented reality.

The blocks illustrated in the FIGS. 5A & 5B may represent steps in a method and/or sections of code in the computer program 48. The illustration of a particular order to the blocks does not necessarily imply that there is a required or preferred order for the blocks and the order and arrangement of the block may be varied. Furthermore, it may be possible for some blocks to be omitted.

The apparatus 30 may enable mediated reality and/or augmented reality and/or virtual reality, for example using the method 60 illustrated in FIG. 5A or a similar method. The controller 42 stores and maintains a model 50 of the virtual space 20. The model may be provided to the controller 42 or determined by the controller 42. For example, sensors in input circuitry 44 may be used to create overlapping depth maps of the virtual space from different points of view and a three dimensional model may then be produced.

At block 62 it is determined whether or not the model of the virtual space 20 has changed. If the model of the virtual space 20 has changed the method moves to block 66. If the model of the virtual space 20 has not changed the method moves to block 64.

At block 64 it is determined whether or not the point of view 24 in the virtual space 20 has changed. If the point of view 24 has changed the method moves to block 66. If the point of view 24 has not changed the method returns to block 62.

At block 66, a two-dimensional projection of the three-dimensional virtual space 20 is taken from the location 23 and in the direction 25 defined by the current point of view 24. The projection is then limited by the field of view 26 to produce the virtual scene 22. The method then returns to block 62.

Where the apparatus 30 enables augmented reality, the virtual space 20 comprises objects 11 from the real space 10 and also visual elements 28 not present in the real space 10. The combination of such visual elements 28 may be referred to as the artificial virtual space. FIG. 5B illustrates a method 70 for updating a model of the virtual space 20 for augmented reality.

At block 72 it is determined whether or not the real space 10 has changed. If the real space 10 has changed the method moves to block 76. If the real space 10 has not changed the method moves to block 74. Detecting a change in the real space 10 may be achieved at a pixel level using differentiating and may be achieved at an object level using computer vision to track objects as they move.

At block 74 it is determined whether or not the artificial virtual space has changed. If the artificial virtual space has changed the method moves to block 76. If the artificial virtual space has not changed the method returns to block 72. As the artificial virtual space is generated by the controller 42 changes to the visual elements 28 are easily detected.

At block 76, the model of the virtual space 20 is updated.

The apparatus 30 may enable user-interactive mediation for mediated reality and/or augmented reality and/or virtual reality. The user input circuitry 44 detects user actions using user input 43. These user actions are used by the controller 42 to determine what happens within the virtual space 20. This may enable interaction with a visual element 28 within the virtual space 20.

The apparatus 30 may enable perspective mediation for mediated reality and/or augmented reality and/or virtual reality. The user input circuitry 44 detects user actions. These user actions are used by the controller 42 to determine the point of view 24 within the virtual space 20, changing the virtual scene 22. The point of view 24 may be continuously variable in position and/or direction and user action changes the position and/or direction of the point of view 24. Alternatively, the point of view 24 may have discrete quantised positions and/or discrete quantised directions and user action switches by jumping to the next position and/or direction of the point of view 24.

The apparatus 30 may enable first person perspective for mediated reality, augmented reality or virtual reality. The user input circuitry 44 detects the user's real point of view 14 using user point of view sensor 45. The user's real point of view is used by the controller 42 to determine the point of view 24 within the virtual space 20, changing the virtual scene 22. Referring back to FIG. 3A, a user 18 has a real point of view 14. The real point of view may be changed by the user 18. For example, a real location 13 of the real point of view 14 is the location of the user 18 and can be changed by changing the physical location 13 of the user 18. For example, a real direction 15 of the real point of view 14 is the direction in which the user 18 is looking and can be changed by changing the real direction of the user 18. The real direction 15 may, for example, be changed by a user 18 changing an orientation of their head or view point and/or a user changing a direction of their gaze. A head-mounted apparatus 30 may be used to enable first-person perspective mediation.

The apparatus 30 may comprise as part of the input circuitry 44 point of view sensors 45 for determining changes in the real point of view.

For example, positioning technology such as GPS, triangulation (trilateration) by transmitting to multiple receivers and/or receiving from multiple transmitters, acceleration detection and integration may be used to determine a new physical location 13 of the user 18 and real point of view 14.

For example, accelerometers, electronic gyroscopes or electronic compasses may be used to determine a change in an orientation of a user's head or view point and a consequential change in the real direction 15 of the real point of view 14.

For example, pupil tracking technology, based for example on computer vision, may be used to track movement of a user's eye or eyes and therefore determine a direction of a user's gaze and consequential changes in the real direction 15 of the real point of view 14.

The apparatus 30 may comprise as part of the input circuitry 44 image sensors 47 for imaging the real space 10.

An example of an image sensor 47 is a digital image sensor that is configured to operate as a camera. Such a camera may be operated to record static images and/or video images In some, but not necessarily all embodiments, cameras may be configured in a stereoscopic or other spatially distributed arrangement so that the real space 10 is viewed from different perspectives. This may enable the creation of a three-dimensional image and/or processing to establish depth, for example, via the parallax effect.

In some, but not necessarily all embodiments, the input circuitry 44 comprises depth sensors 49. A depth sensor 49 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the real space 10 with light, preferably invisible light such as infrared light, with a spatially dependent pattern. Detection of a certain pattern by the receiver allows the real space 10 to be spatially resolved. The distance to the spatially resolved portion of the real space 10 may be determined by time of flight and/or stereoscopy (if the receiver is in a stereoscopic position relative to the transmitter).

In some but not necessarily all embodiments, the input circuitry 44 may comprise communication circuitry 41 in addition to or as an alternative to one or more of the image sensors 47 and the depth sensors 49. Such communication circuitry 41 may communicate with one or more remote image sensors 47 in the real space 10 and/or with remote depth sensors 49 in the real space 10.

Figure 6A:
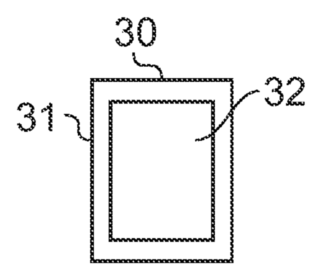
FIGS. 6A and 6B illustrate examples of apparatus that enable display of at least parts of the virtual scene to a user.
Figure 6B:
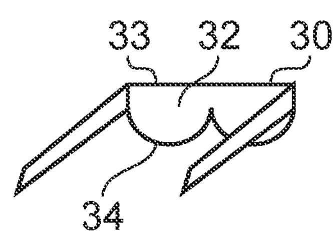

FIGS. 6A and 6B illustrate examples of apparatus 30 that enable display of at least parts of the virtual scene 22 to a user. Other examples of apparatus 30 that enable display of at least parts of the virtual scene 22 to a user may be used.

FIG. 6A illustrates a handheld apparatus 31 comprising a display screen as display 32 that displays images to a user and is used for displaying the virtual scene 22 to the user. The apparatus 30 may be moved deliberately in the hands of a user in one or more of the previously mentioned six degrees of freedom.

The handheld apparatus 31 may be or may be operated as a see-video arrangement for augmented reality that enables a live or recorded video of a real scene 12 to be displayed on the display 32 for viewing by the user while one or more visual elements 28 are simultaneously displayed on the display 32 for viewing by the user. The combination of the displayed real scene 12 and displayed one or more visual elements 28 provides the virtual scene 22 to the user.

If the handheld apparatus 31 has a camera mounted on a face opposite the display 32, it may be operated as a see-video arrangement that enables a live real scene 12 to be viewed while one or more visual elements 28 are displayed to the user to provide in combination the virtual scene 22.

FIG. 6B illustrates a head-mounted apparatus 33 comprising a display 32 that displays images to a user. The head-mounted apparatus 33 may be moved automatically when a head of the user moves.

The head-mounted apparatus 33 may be a see-through arrangement for augmented reality that enables a live real scene 12 to be viewed while one or more visual elements 28 are displayed by the display 32 to the user to provide in combination the virtual scene 22. In this case a visor 34, if present, is transparent or semi-transparent so that the live real scene 12 can be viewed through the visor 34.

The head-mounted apparatus 33 may be operated as a see-video arrangement for augmented reality that enables a live or recorded video of a real scene 12 to be displayed by the display 32 for viewing by the user while one or more visual elements 28 are simultaneously displayed by the display 32 for viewing by the user. The combination of the displayed real scene 12 and displayed one or more visual elements 28 provides the virtual scene 22 to the user. In this case a visor 34 is opaque and may be used as display 32.

Referring back to FIG. 4, an apparatus 30 may enable user-interactive mediation for mediated reality and/or augmented reality and/or virtual reality. The user input circuitry 44 detects user actions using user input 43. These user actions are used by the controller 42 to determine what happens within the virtual space 20. This may enable interaction with a visual element 28 within the virtual space 20.

The detected user actions may, for example, be gestures performed in the real space 10. Gestures may be detected in a number of ways. For example, depth sensors 49 may be used to detect movement of parts a user 18 and/or or image sensors 47 may be used to detect movement of parts of a user 18 and/or positional/movement sensors attached to a limb of a user 18 may be used to detect movement of the limb.

Object tracking may be used to determine when an object or user changes. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, facial movement. These are scene independent user (only) movements relative to the user.

The apparatus 30 may track a plurality of objects and/or points in relation to a user's body, for example one or more joints of the user's body. In some examples, the apparatus 30 may perform full body skeletal tracking of a user's body.

The tracking of one or more objects and/or points in relation to a user's body may be used by the apparatus 30 in gesture recognition and so on.

Figure 7A:
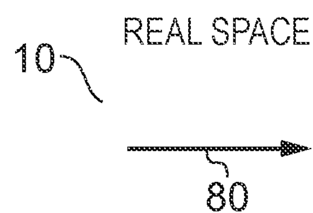
FIG. 7A illustrates an example of a gesture in a real space and FIG. 7B illustrates a corresponding representation of the gesture rendered in the virtual scene.

Referring to FIG. 7A, a particular gesture 80 in the real space 10 is a gesture user input used as a 'user control' event by the controller 42 to determine what happens within the virtual space 20. A gesture user input is a gesture 80 that has meaning to the apparatus 30 as a user input.

Figure 7B:
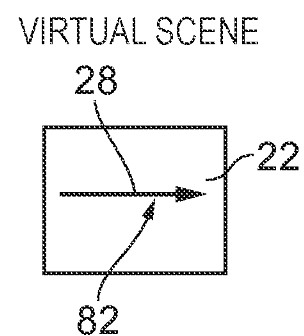

Referring to FIG. 7B, illustrates that in some but not necessarily all examples, a corresponding representation of the gesture 80 in real space is rendered in the virtual scene 22 by the apparatus 30. The representation involves one or more visual elements 28 moving 82 to replicate or indicate the gesture 80 in the virtual scene 22.

A gesture 80 may be static or moving. A moving gesture may comprise a movement or a movement pattern comprising a series of movements. For example it could be making a circling motion or a side to side or up and down motion or the tracing of a sign in space. A moving gesture may, for example, be an apparatus-independent gesture or an apparatus-dependent gesture. A moving gesture may involve movement of a user input object e.g. a user body part or parts, or a further apparatus, relative to the sensors. The body part may comprise the user's hand or part of the user's hand such as one or more fingers and thumbs. In other examples, the user input object may comprise a different part of the body of the user such as their head or arm. Three-dimensional movement may comprise motion of the user input object in any of six degrees of freedom. The motion may comprise the user input object moving towards or away from the sensors as well as moving in a plane parallel to the sensors or any combination of such motion.

A gesture 80 may be a non-contact gesture. A non-contact gesture does not contact the sensors at any time during the gesture.

A gesture 80 may be an absolute gesture that is defined in terms of an absolute displacement from the sensors. Such a gesture may be tethered, in that it is performed at a precise location in the real space 10. Alternatively a gesture 80 may be a relative gesture that is defined in terms of relative displacement during the gesture. Such a gesture may be un-tethered, in that it need not be performed at a precise location relative in the real space 10 and may be performed at a large number of arbitrary locations.

A gesture 80 may be defined as evolution of displacement, of a tracked point relative to an origin, with time. It may, for example, be defined in terms of motion using time variable parameters such as displacement, velocity or using other kinematic parameters. An un-tethered gesture may be defined as evolution of relative displacement Δd with relative time Δt.

A gesture 80 may be performed in one spatial dimension (1D gesture), two spatial dimensions (2D gesture) or three spatial dimensions (3D gesture).

Figure 8:
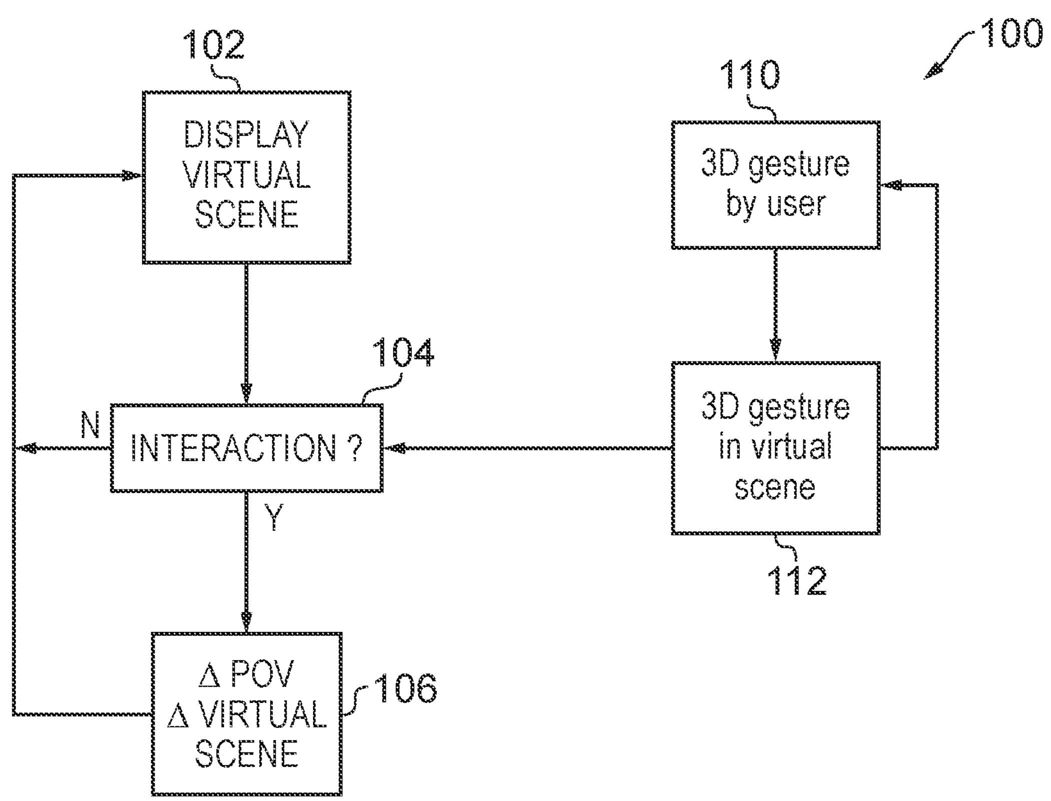
FIG. 8 illustrates an example of a method that enables a three-dimensional user gesture to determine a position of a point of view within the virtual space and thereby control the virtual scene.

FIG. 8 illustrates a method 100 that enables a three-dimensional user gesture 80 to determine a position 23 of a point of view 24 within the virtual space 20 and thereby control the virtual scene 22. The method 100 enables third person perspective-mediation. The method 100 may be applied to mediated reality, augmented reality or virtual reality.

It may help in understanding the method 100 of FIG. 8 to refer also to FIG. 11 which illustrates an example of different points of view 24 at different positions 23 within the virtual space 20, to FIG. 12D which illustrates a user gesture 80 that determines a position 23 of a point of view 24 within the virtual space 20 and to FIGS. 12C and 12E which illustrate examples of a virtual scene 22 before and after changing a position 23 of a point of view 24 within the virtual space 20.

Referring to FIG. 8, at block 102, the method 100 causes display to a user of a current virtual scene 22 of a virtual space 20 from a current point of view 24 at a current position 23. The current virtual scene 22 comprises a user-input artificial virtual object 120.

At block 110, 112 the method 100 is mapping any three-dimensional gestures 80 of the user 18 to corresponding three-dimensional gestures in the virtual space 20. At block 104, it is determined whether or not the corresponding three-dimensional gesture in the virtual space 20 interacts with the user-input artificial virtual object 120. If there is no interaction, the method returns to block 102. If there is interaction, the method moves to block 106.

Interaction may, for example, occur when the corresponding three-dimensional gesture in the virtual space 20 is co-located or substantially co-located with the user-input artificial virtual object 120 in the virtual space 20. Interaction may, for example, additionally require that the corresponding three-dimensional gesture in the virtual space 20 is a predetermined gesture relative to the user-input artificial virtual object 120 rather than any arbitrary gesture.

At block 106, in response to determining that the corresponding three dimensional gesture 80 in the virtual space 20 interacts with the user-input artificial virtual object 120, the method 100 causes a change in the point of view 24 used to determine the virtual scene 22 by changing the position 23 of the point of view 24 within the virtual space 20. The method then moves to block 102, where the method 100 causes display to the user of a new virtual scene 22 of the virtual space 20 from a new point of view 24 at a new position 23 different to the previous current position 23.

Then the new position becomes the current position, the new point of view becomes the current point of view and the virtual scene becomes the current virtual scene and the method 100 is then repeated.

It will therefore be appreciated that the method 100 allows a user 18 to perform gestures 80 in three dimensions that control a position 23 of a point of view 24 within a virtual space 20 and thereby control the virtual scene 22 displayed to the user 18.

Figure 9B:
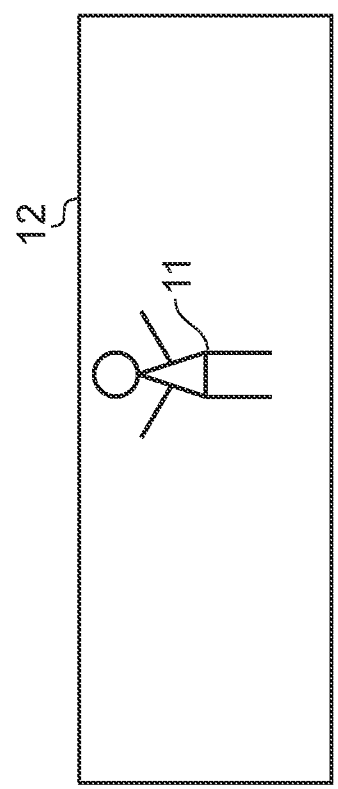
FIG. 9A illustrates an example of an arrangement of cameras in a real space and FIG. 9B illustrates a real scene captured by one of the cameras.
Figure 9A:
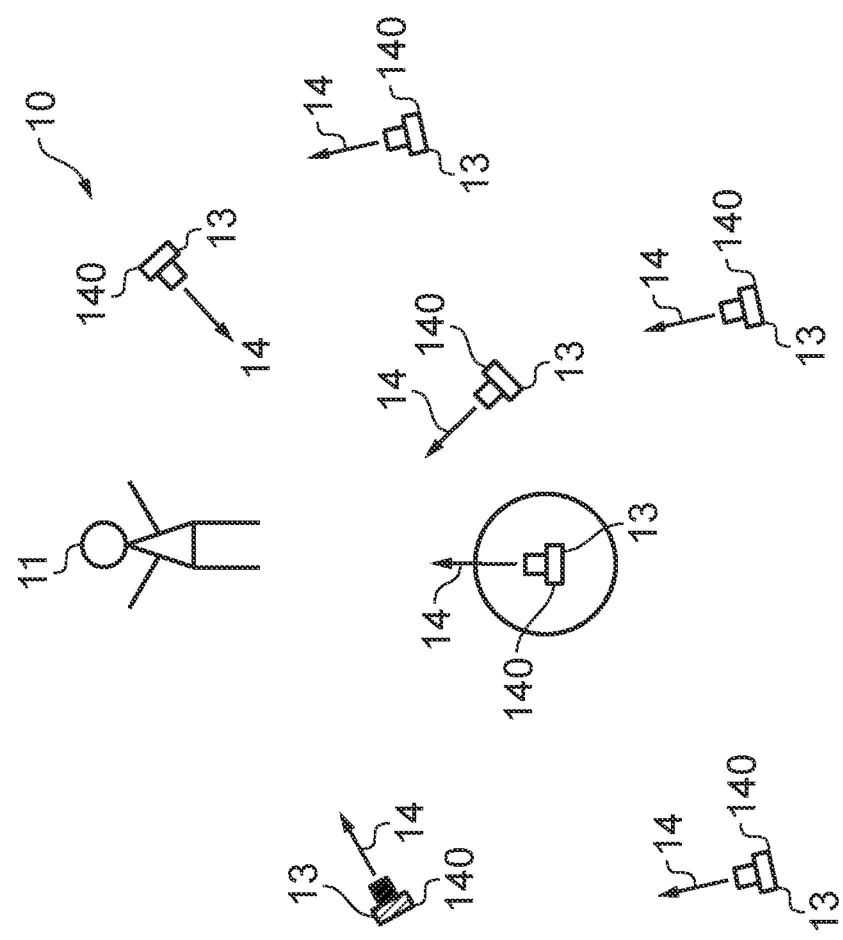

FIG. 9A illustrates an arrangement of cameras 140 in a real space 10. In this example one or more of the cameras 140 may be a panoramic camera 140' that takes a 360 degree image.

In this figure, the position 13 and the point of view 14 of each camera 140 is illustrated. The different positions 13 of the different cameras 140 each have one or more points of view 14 defining one or more real scenes.

In the example illustrated, FIG. 9B illustrates a real scene 12 captured by one of the cameras 140. The real scene 12 includes a real object 11. In this example, the real scene is a panoramic real scene 12 captured by a panoramic camera.

The arrangement of cameras 140 may be ad-hoc (casual) and not predetermined, constrained or measured. The cameras 140 may, for example, be owned or controlled by different persons. Each of the cameras 140 is capable of capturing images of the real space 10. Some of these images will overlap and it is therefore possible to obtain images of the real object 11 from different points of view 14 at different positions 13.

In some embodiments the cameras 140 may capture images simultaneously or with temporal overlap. In other examples, the cameras 140 may operate independently.

The images captured by the cameras 140 may, for example, be still images or they may, for example, be videos. It is preferable for the captured images to be time stamped so that temporal synchronization may be achieved between images captured by different cameras 140.

Figure 10:
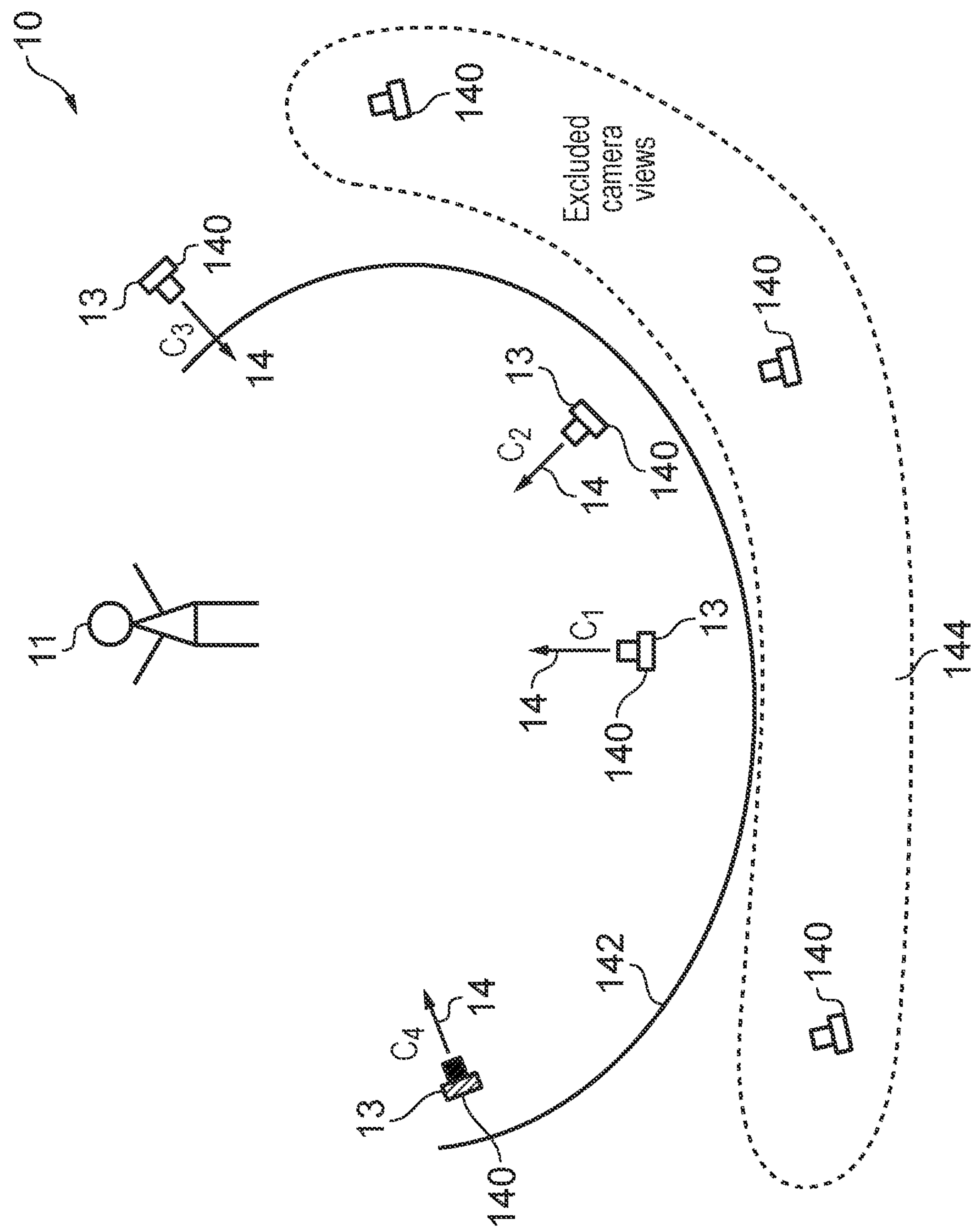
FIG. 10 illustrates an example of a sub-set (a sequence) of different positions in real space.

FIG. 10 illustrates that it may be appropriate to only use a sub-set of cameras 140 if one wishes to image a particular real object 11. In this figure, the position 13 and the point of view 14 of each camera 140 is illustrated. The different positions 13 of the different cameras 140 each have one or more points of view 14 defining one or more real scenes.

FIG. 10 illustrates sub-set (a sequence) 142 of different positions 13 that have points of view 14 defining real scenes 12 comprising, in common, the real object(s) of interest 11.

It will be appreciated that some of the positions 13 associated with some 144 of the cameras 140 are excluded from the sub-set 142, whereas other positions 13 of the cameras 140 are included in the sub-set 142. The definition of the sub-set 142 will be described with reference to FIGS. 11 and 12.

FIG. 11 illustrates a virtual space 20 that corresponds to the real space 10 illustrated in FIG. 10. The real object 11 has a corresponding virtual object 21 in the virtual space 20. Each of the different positions 13 of the sub-set 142 have points of view 14 defining real scenes 12. Each of the different positions 13 of the sub-set 142 has an equivalent different position 23 in the virtual space 20. Each of the points of view 14 for the different positions 13 of the sub-set 142 has a corresponding point of view 24 in the virtual space 20 defining a virtual scene 22. As previously described, a mapping may be used to map the real space 10 to the virtual space 20. The sub-set 142 of different real positions 13 and associated different points of views 14 is therefore mapped to an equivalent sub-set (sequence) 142 in the virtual space of different virtual positions 23 and associated different points of view 24.

Although FIG. 11 illustrates points of view 24 at positions 23 in the virtual space 20 that correspond to the points of view 14 at the positions 13 of the cameras 140 in the real space, it is possible in other examples to have points of view 24 at positions 23 that do not have points of view 14 and positions 13 of cameras 140 in the real space 10. For example, it may be possible to use image processing techniques to use two or more camera images to obtain a synthesized image from a position that does not correspond to the position of any of the cameras 140 used to form the synthesized image.

Figure 13:
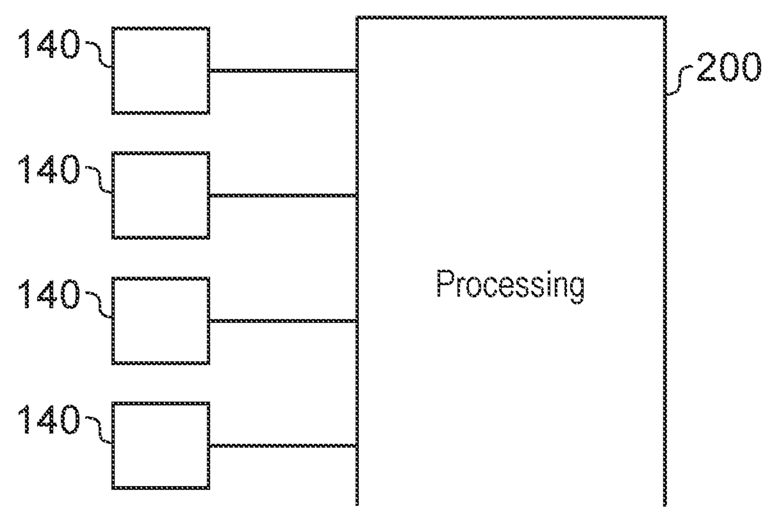
FIG. 13 illustrates an example of a processing system

FIG. 13, illustrates an example of a processing system 200 that may receive image data from the respective cameras 140. The processing system may be part of the apparatus 30 or separate from the apparatus 30. The processing system 200 may be configured to determine a sequence 142 of different positions 23 in the virtual space 20 that have points of view 24 defining virtual scenes 22 comprising, in common, a virtual object 21 or virtual objects 21 of interest. Each position 23 in the sequence 142 has an associated point of view 24 that defines a virtual scene 22 and each of those virtual scenes 22 include, from different perspectives, the virtual object or objects 21 of interest. A virtual object 21 of interest may be selected by a user or inferred by the processing system 200 or apparatus 30 from actions of the user.

The new position 23 for a new point of view 24 of the virtual space 20 that is used to produce the new virtual scene 22 may be selected by the user 18 from the sequence 142.

The sequence 142 of different positions 23 may be determined by excluding a plurality of possible positions 23 from the sequence 142 because they do not have a point of view 24 defining a virtual scene 22 comprising the virtual object (s) 21 of interest.

The sequence 142 of different positions 23 may be selected from those positions 23 that have points of view 24 defining virtual scenes 22 comprising, in common, the virtual object(s) 21 of interest in dependence upon satisfaction of one or more quality criteria relating to the virtual object(s) 21 of interest. For example, only those positions 23 may be selected that have in-focus features of the virtual object(s) 21 of interest or have the virtual object(s) 21 of interest occupying at least a required proportion of the field of view or have a required resolution of the image of the virtual object(s) 21 of interest. The sequence 142 is therefore associated with only higher quality images of the virtual object(s) 21 of interest. The quality is determined by the quality criteria which may, for example, be user defined or may for example be predefined.

Determining the sequence 142 of different positions 23, may, in some examples comprise excluding possible positions 23 from the sequence 142 because they do not have a point of view 24 defining a virtual scene 22 comprising, in common, the virtual object(s) 21 of interest that satisfy one or more quality criteria for the virtual object(s) 21 of interest. For example, positions 23 may be excluded from the sequence 142 because the images of the virtual object(s) 21 of interest from those positions do not satisfy the quality criteria such as in-focus, proportion of field of view and resolution as described in the preceding paragraph. The sequence 142 is therefore not associated with lower quality images of the virtual object(s) 21 of interest. The quality is determined by the quality criteria which may, for example, be user defined or may for example be predefined.

FIGS. 12A, 12C and 12E illustrate virtual scenes 22 of the virtual space 20 illustrated in FIG. 11.

In FIG. 12A, the apparatus 30 is displaying to a user a current virtual scene 22 of a virtual space 20 from a current point of view 24 at a current position 23. The virtual scene 22 comprises at least one virtual object 21, which may correspond to a real object 11 in a real space 10. The virtual scene 22 does not comprises an user input artificial virtual object 120.

At FIG. 12B, the user 18 performs an initiation gesture 80 that indicates to the apparatus 30 that the user 18 may wish to control a position 23 of a point of view 24 defining the virtual scene 22.

In response to this initiation gesture 80, the apparatus 30, as illustrated in FIG. 12C, displays to the user 18 the current virtual scene 22 of the virtual space 20 from the current point of view 24 at the current position 23. The virtual scene 22 comprises a user input artificial virtual object 120.

The apparatus 30 or the system 200 determines a sequence 142 of different positions 23 that have points of view 24 defining virtual scenes 22 comprising a virtual object 21 of interest.

In this example, the virtual object 21 of interest is determined to be the virtual object 21 at a centre of the field of view 26 of the current scene 22. If the apparatus 30 is performing user-perspective mediated mediated reality, augmented reality or virtual reality, for example via a headset apparatus 33, then the object of interest 21 may be determined by a direction of the user's gaze when performing the three-dimensional gesture 80. As previously described, the user's gaze determines the point of view 24 from the current position 23 and therefore defines the content of the virtual scene 22.

In some, but not necessarily all examples, displaying to the user 18 the virtual scene 22 of the virtual space 20 from the point of view 24 at the position 23 may comprise displaying a real scene 12 captured from a point of view 14 at a real position 13 in a real space 10, corresponding to the point of view 24 at the position 23 in the virtual space 20 and displaying the user-input artificial virtual object 120.

In some, but not necessarily all examples, the user-input artificial virtual object 120 is elongate and comprises one or more indicators 121. Each indicator 121 indicates at least an associated position 23 that has a point of view 24 defining a putative virtual scene 22. The user 18 is able to select an indicator 121 to cause display to the user 18 of a new virtual scene 22 of the virtual space 20 from a new point of view 24 at a position 23 associated with the selected indicator 121.

In the example illustrated in FIG. 12C, the current position $C_1$ is positioned centrally on the elongate user-input artificial virtual object 120 at a central indicator 121. The indicator to the right on the elongate user-input artificial virtual object 120 is associated with the position $C_2$ in FIG. 11 and the indicator 121 to the left on the user-input artificial virtual object 120 is associated with the position $C_4$ in FIG. 11. In FIG. 11 the position $C_2$ is to the right of the central position $C_1$ and the position $C_4$ is to the left of the central position $C_1$. The order of the indicators 121 along a length of the user-input artificial virtual object 120 is therefore the same as an order of the positions 23, associated with the indicators 121, along the sequence 142. The spacing of the indicators 121 along the length of the user-input artificial virtual object 120 may be proportional to a spacing of the positions 23, associated with the indicators 121, along the sequence 142.

Selecting the indicator 121 to the right of the central indicator 121 would cause the virtual scene 22 to change to the virtual scene 22 defined by the combination of the position $C_2$ and the point of view 24 at that position. Selection by the user of the indicator 121 to the left of the central indicator 121 would cause the virtual scene 22 to change to that defined by the position $C_4$ and the point of view 24 at that position.

FIG. 12D illustrates a three-dimensional gesture 80 of the user 18 which is mapped to a corresponding three dimensional gesture in the virtual space 20 that interacts with the user-input artificial virtual object 120. In this example, the three-dimensional gesture 80 is a pull or tug to the left which moves the indicator 121 associated with the position $C_2$ from a position to the right to a central position. This simultaneously causes a change in the virtual scene 22 to a virtual scene 22 defined by the position $C_2$ and the point of view 24 at the position $C_2$. In this example, the corresponding three dimensional gesture in the virtual space 20 that interacts with the user-input artificial virtual object 120 may be a pull or tug to the left which moves the indicator 121 from a position to the right to a central position or may be a pull or tug to the right which moves an indicator 121 from a position to the left to a central position. This simultaneously causes a change in the virtual scene 22 to a virtual scene 22 defined by the position 23 of the point of view 24 and by the point of view 24 at that position.

In some but not necessarily all examples, any pull or tug to the left may automatically move the next indicator 121 from a position on the right of the central position to the central position or any pull or tug to the right may automatically move the next indicator 121 from a position on the left of the central position to the central position.

In some but not necessarily all examples, the pull or tug to the left gradually moves the indicator 121 from a position to the right towards a central position or the pull or tug to the right gradually moves an indicator 121 from a position to the left towards a central position. If the user stop pulling or tugging before the indicator 121 has reached the central position, the central position is occupied by a synthetic position 23 between the position $C_1$ and $C_2$ ($C_4$). The synthetic position 23 and a synthetic point of view 24 in the virtual space 20 is used to generate, using digital image processing, a synthetic virtual scene 22 that is seen by the user.

It will be appreciated from FIG. 12C that the position of the indicators 121 on the elongate user-input artificial virtual object 120 is not necessarily to scale. The relative position of each indicator 121 in this example indicates the relative positioning of the positions 23 that have points of view 24 defining the putative virtual scenes 22.

In some, but not necessarily all examples, the putative virtual scenes 22 at least partially overlap with the current virtual scene 22. For example the current virtual scene 22 and the putative virtual scenes 22 may each comprise the virtual object of interest 21 and the virtual object of interest 21 may be centrally located within the virtual scenes 22. FIG. 12E illustrates a further indicator 122 which indicates a gap in the available views.

In some but not necessarily all embodiments, the elongate artificial virtual object 120 may be presented in the form of a string or a rope with knots and/or coloring. The three-dimensional user input gesture 80 then represents pulling on the rope or string, which does not stretch, to effectively pull the desired virtual scene 22 into view.

In some, but not necessarily all embodiment, it may be possible for the apparatus 30 to display a representation of the three-dimensional gesture 80 mapped to the virtual space 20 within the displayed virtual scene 22 during the three-dimensional gesture 80.

FIG. 12E illustrates that in response to determining that the corresponding three-dimensional gesture 80 in a virtual space 20 interacts with the user-input artificial virtual object 120, the apparatus 30 displays to the user 18 a new virtual scene 22 of the virtual space 20 from a new point of view 24 at a new position 23 different to the current position 23 illustrated in FIG. 12C. In this example, the user-input artificial virtual object 120 is still displayed in the virtual scene 22 after the position 23 of the point of view 24 has been changed to that illustrated in FIG. 12E but this may be optional.

In the above described example, the navigation between the different positions 23 of the points of view 24 has been discreet. The three-dimensional user gesture 80 causes a jump from the position $C_1$ to the position $C_2$ and a consequential jump in the viewpoint of the virtual scene 22.

In other examples, it may be possible and desirable to have transitions between the discreet positions $C_1$ and $C_2$ ($C_4$) in the virtual space 20. In this example, it may be possible to synthesize synthetic virtual scenes 20 that do not correspond to a real camera image and to progressively display the synthetically generated virtual scenes 20 as the user-input artificial virtual object 120 is interacted with by the user. There may therefore be a progressive transition of virtual scenes 22 as the user-input artificial virtual object 120 is moved by the three-dimensional user gesture 80 from having the indicator 121 for position $C_1$ central to having the indicator 121 for position $C_2$ ($C_4$) central. As the artificial virtual object 120 is moved by the three-dimensional user gesture 80, the indicator 121 for position $C_2$ ($C_4$) moves towards the central position. While this movement is occurring, the central position is occupied by a synthetic position 23 between the position $C_1$ and $C_2$ ($C_4$). The synthetic position 23 and a synthetic point of view 24 in the virtual space 20 is used to generate, using digital image processing, a synthetic virtual scene 22 that is seen by the user.

It will therefore be appreciated from the foregoing description that examples provide for third party perspective mediation via three-dimensional gestures in respect of a user interface 120 displayed within a virtual scene 22. This may be provided in addition to first party perspective mediation that may be, for example, provided via head movement.

The above described system may be used to enable a user 18 to provide, using three dimensional gestures 80, third-party mediated mediated reality, virtual reality or augmented reality. This can be achieved in respect of still images, video images, real time images or recorded images In the description of FIGS. 8 to 13 reference has been made to the performance of three-dimensional gestures 80. These gestures 80 may be static or they may be moving gestures. They may, for example, involve the movement of the user input object e.g. a user body part or parts or further apparatus. A three-dimensional gesture is a gesture that is performed in three dimensions either via a static pose in three dimensions or by movement through three dimensions. The gesture may be a non-contact gesture that does not contact the apparatus 30. The gesture 80 may be a relative gesture that is defined by relative displacement during the gesture. The gesture 80 may be un-tethered so that it does not need to be performed in a precise location either in absolute space or relative to the apparatus 30.

The methods described in relation to FIGS. 8 to 13 may, for example, be performed by any of the described apparatus 30. As previously described, user input circuitry 44 may be used to detect user actions that determine the point of view 24 within the virtual space 20, changing the virtual scene 22.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The controller 42 may, for example be a module. The apparatus 30 may be a module. The input circuitry may be a module or comprise modules. The display 32 may be a module. The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising at least one processor and at least one memory, the memory comprising machine-readable instructions, that when executed cause the apparatus to:

cause display of a virtual scene of a virtual space from a current point of view at a current position;

determine a sequence of distinct viewpoints of at least a portion of the virtual space;

cause display of a user-input artificial virtual object overlaid on the virtual scene, the user-input artificial virtual object and indicating a plurality of selectable elements, each of the selectable elements overlaid in a position over the virtual scene corresponding to positions of the respective distinct viewpoints of the virtual scene, that when selected, provide for changing a point of view of the displayed virtual scene;

map a three-dimensional gesture of a user to a corresponding three-dimensional gesture in the virtual space that interacts with the user-input artificial virtual object for changing the point of view of the user of the virtual scene from at least a first point to a second viewpoint in the sequence of distinct viewpoints; and in response to determining that the corresponding three-dimensional gesture in the virtual space interacts with the user-input artificial virtual object, display to the user a new virtual scene of the virtual space from a new point of view at a new position different than the current position.

2. The apparatus of claim 1, wherein the virtual scene and the new virtual scene have, in common, at least some virtual objects and at least one of the virtual objects is an elongated user-input artificial virtual object used with the corresponding three-dimensional gesture for navigation from the point of view of the virtual scene of the virtual space to the new point of view of the new virtual scene of the virtual space.

3. The apparatus of claim 1, wherein the one or more virtual objects of interest are determined by a direction of gaze of the user when performing the three-dimensional gesture.

4. The apparatus of claim 1, wherein the new position is a next position in the sequence of different positions.

5. The apparatus of claim 1, wherein determining the sequence of distinct viewpoints comprises excluding a plurality of possible positions from the sequence because they do not have a point of view defining a virtual scene comprising the one or more virtual objects of interest.

6. The apparatus of claim 3, further caused to select the sequence of different positions from positions that have points of view defining virtual scenes comprising, in common, the one or more virtual objects of interest in dependence upon satisfaction of one or more criteria for the one or more virtual objects of interest and/or further comprising excluding a plurality of possible positions from the sequence of different positions because they do not have a point of view defining a virtual scene comprising the one or more virtual objects of interest that satisfy one or more criteria for the one or more virtual objects of interest.

7. The apparatus of claim 1, wherein the user-input artificial virtual object is elongate and comprises one or more indicators, wherein each indicator indicates at least an associated position that has a point of view defining a putative virtual scene and wherein a user selects an indicator to cause display to the user of a new virtual scene of the virtual space from a new point of view at the position associated with the selected indicator.

8. The apparatus of claim 7, wherein relative positioning of each indicator along a length of the user-input artificial virtual object indicates at least relative positioning of the positions that have points of view defining putative virtual scenes.

9. The apparatus of claim 7, wherein the putative virtual scenes at least partially overlap with the virtual scene.

10. The apparatus of claim 1, further caused to display at least one user-input artificial virtual object, when displaying to the user a new virtual scene of the virtual space from a new point of view at the new position different atollthan the first position.

11. The apparatus of claim 1, further caused to display a representation of the three-dimensional gesture mapped to the virtual space within the displayed virtual scene during the three-dimensional gesture.

12. The apparatus of claim 1, wherein displaying to a user a virtual scene of a virtual space from a point of view at a position comprises displaying a real scene captured from the first point of view at a first real position in a real space, corresponding to the point of view at the position in the virtual space, and displaying at least the user input artificial virtual object.

13. The apparatus of claim 1, wherein displaying to a user a virtual scene of a virtual space from a point of view at a position comprises displaying a synthetically generated scene from a synthetic point of view at a synthetic position, wherein the synthetically generated scene is generated from real scenes captured from different points of view and wherein the synthetic point of view at the synthetic position corresponds to the point of view at the position in the virtual space, and displaying at least the user input artificial virtual object.

14. A method comprising:

causing display of a virtual scene of a virtual space from a current point of view at a current positional;

determining a sequence of distinct viewpoints of at least a portion of the virtual space;

causing display of a user-input artificial virtual object overlaid on the virtual scene, the input artificial virtual object and indicating a plurality of selectable elements, each of the selectable elements overlaid in a position over the virtual scene corresponding to positions of the respective distinct viewpoints of the virtual scene, that when selected, provide for changing a point of view of the displayed virtual scene;

mapping a three-dimensional gesture of a user to a corresponding three-dimensional gesture in the virtual space that interacts with the user-input artificial virtual object for changing the point of view of the user of the virtual scene from at least a first viewpoint to a second viewpoint in the sequence of distinct viewpoints; and in response to determining that the corresponding three-dimensional gesture in the virtual space interacts with the user-input artificial virtual object, displaying to the user a new virtual scene of the virtual space from a new point of view at a new position different than the current position.

15. The method of claim 14, wherein the virtual scene and the new virtual scene have, in common, at least some virtual objects and at least one of the virtual objects is an elongated user-input artificial virtual object used with the corresponding three-dimensional gesture for navigation from the point of view of the virtual scene of the virtual space to the new point of view of the new virtual scene of the virtual space.

16. The method of claim 14, wherein the one or more virtual objects of interest are determined by a direction of gaze of the user when performing the three-dimensional gesture.

17. The method of claim 14, wherein the new position is a next position in the sequence of different positions.

18. The method of claim 14, wherein determining a sequence of different positions comprises excluding a plurality of possible positions from the sequence because they do not have a point of view defining a virtual scene comprising the one or more virtual objects of interest.

* * * * *

UNITED STATES PATENT AND TRADEMARK OFFICE

CERTIFICATE OF CORRECTION

PATENT NO. : 10,884,576 B2
APPLICATION NO. : 15/580080
DATED : January 5, 2021
INVENTOR(S) : Mate et al.

It is certified that error appears in the above-identified patent and that said Letters Patent is hereby corrected as shown below:

In the Claims

Column 17, Claim 1, Line 60:
"--object and indicating--", should read --object indicating--

Column 18, Claim 1, Line 3:
"--a first point to--", should read --a first viewpoint to--

Column 18, Claim 10, Line 58:
"--different atollthan the--", should read --different than the--

Column 19, Claim 14, Line 16:
"--current positional;--", should read --current position;--

Column 19, Claim 14, Line 21:
"--object and indicating--", should read --object indicating--

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*